Aug. 24, 1943.        C. F. SALTZ        2,327,607
BALANCING ROTATING ELEMENT
Original Filed March 5, 1941
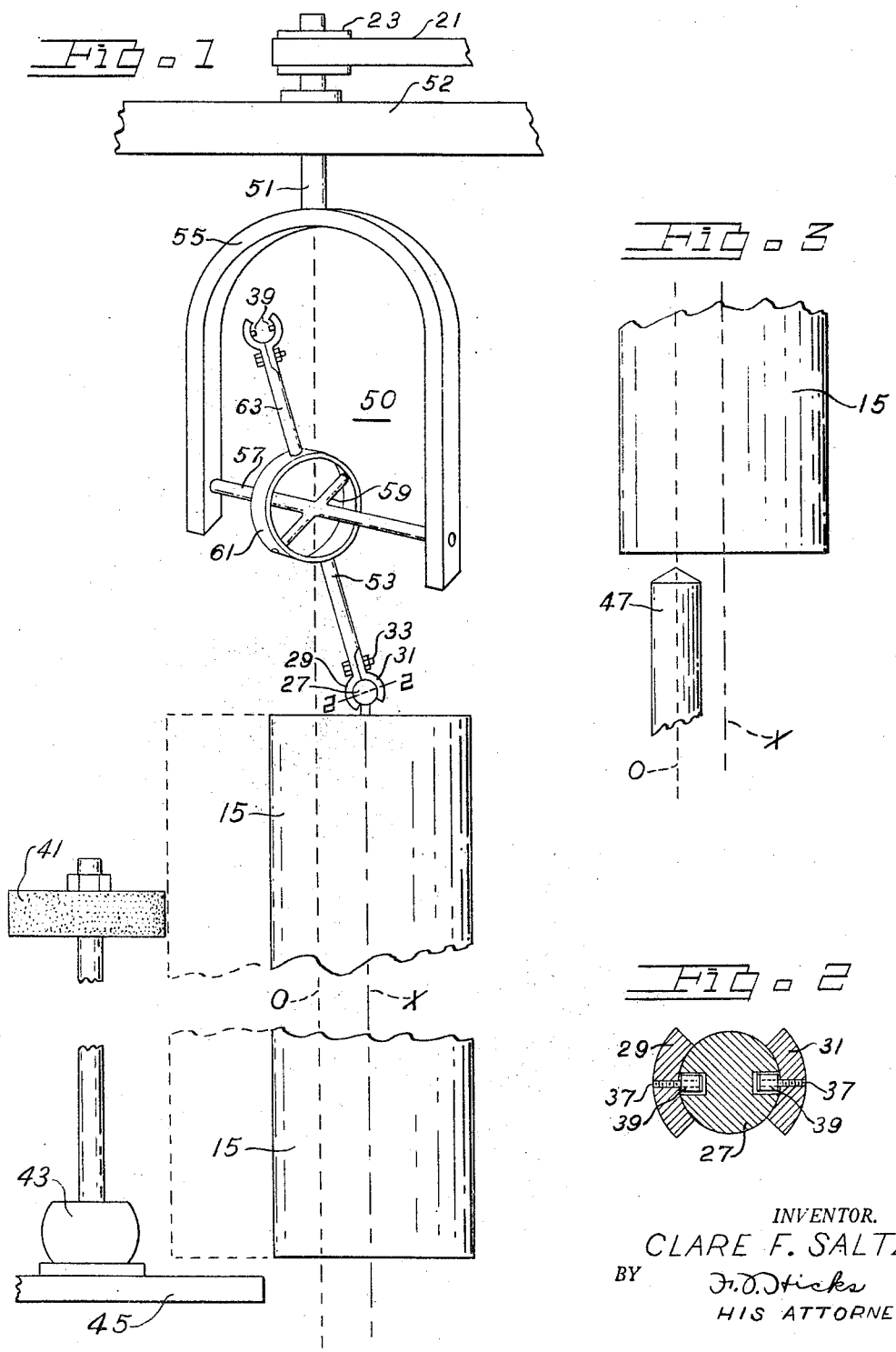
INVENTOR.
CLARE F. SALTZ
BY  J. O. Hicks
HIS ATTORNEY Patented Aug. 24, 1943

2,327,607

UNITED STATES PATENT OFFICE 2,327,607

BALANCING ROTATING ELEMENT

Clare F. Saltz, Ypsilanti, Mich.

Original application March 5, 1941, Serial No. 381,849. Divided and this application February 9, 1942, Serial No. 430,008

5 Claims. (Cl. 51—105)

My invention pertains to an improved method of and means for preparing rotating elements of metal or other material for balanced rotation, and this application is a division of my copending application Serial No. 381,849 filed March 5, 1941.

In the production of rotatable machine parts such as flywheels, crank shafts, and the like, it is very important to provide a uniform distribution of the mass around the axis of rotation in order to obtain a balance as nearly perfect as possible in the rotating element. This is especially important in the production of parts to be rotated at high speeds. As is well known, unbalanced machine parts rotating at high speed in fixed bearings absorb a large amount of energy and also cause wear and vibration. Also, when the unbalance is considerable, it is sometimes necessary to change the operating speed to some other speed less suitable for the operation desired. Such unbalance exits when the center of gravity of the rotating part does not coincide with the axis of rotation. But the careful balancing of such parts requires the expenditure of considerable skill and time which adds greatly to the cost of production of such elements.

It has been customary to carefully test the element to determine on which side of the axis it is overbalanced and the magnitude thereof. An attempt is then generally made to remove, or to add, sufficient metal at a proper location on the element to balance it. This is usually done by a cut and try method successively testing the part and removing metal therefrom. I am also aware that various arrangements have been previously provided for automatically removing metal from such an element to balance it in an attempt to simplify this difficult and costly operation.

In accordance with my invention, metal is not removed from the element for the purpose of balancing but instead the element is prepared for balanced rotation by forming bearing surfaces so located on the element that when the element is mounted to rotate thereon it is balanced to the desired degree of perfection.

It is accordingly an object of my invention to provide an improved method of and means for balancing rotating elements in this manner.

It is also an object of my invention to provide an improved method of and means for balancing a rotating element by universally mounting the element to be balanced, rotating the element at a speed sufficient to cause it to select its axis of rotation and describe a surface of revolution, and then forming bearing surfaces on the portions of the element which are to be journalled by removing metal therefrom at the points of coincidence of the actual surface of the element with the surface of revolution so that bearing surfaces are formed concentric with the self selected axis of rotation of the rotating element.

Another object of my invention is to provide an improved apparatus for so balancing rotating elements comprising a counter-balanced double universal joint arrangement.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawing disclosing specific embodiments of my invention, similar reference characters being applied to corresponding elements throughout, and in which:

Fig. 1 is a side elevational view, partially broken away, showing a counter-balanced double universal joint embodiment of my balancing apparatus arranged for balancing an element;

Fig. 2 is an enlarged detail sectional view taken on line 2—2 in Fig. 1; and

Fig. 3 is an enlarged fragmentary view showing how the counter-balanced double universal joint arrangement, of Fig. 1, may be utilized for locating and forming an internal bearing aperture to prepare an element for balanced rotation on a pivot pin or shaft.

Referring more specifically to Fig. 1 of the drawing, I have illustratively disclosed an embodiment of my apparatus comprising a universal joint on the lower end of a drive shaft 51, an intermediate bar 53 projecting down therefrom and holding means comprising a second universal joint on the lower end of the intermediate bar where it holds the sphere 27 provided on the upper end of the element 15 being prepared for balanced rotation. The drive shaft 51 passes through and is journalled in any suitable structural member 52 wherein it may be driven from any suitable power source, as by a belt 21 passing around a belt pulley 23 secured on the upper end of the shaft.

The universal joint on the lower end of the drive shaft 51 comprises a U shaped bracket 55 with the yoke secured to the lower end of the drive shaft and the legs thereof projecting downwardly. Journalled in and extending between the ends of the legs of the bracket 55 is a shaft 57 having a pair of cross arms 59 projecting in opposite directions from the center. A ring 61 is pivoted on the outer ends of the cross arms 59 and the intermediate bar 53 projects from the lower side of the ring, to which it is secured in any suitable manner, as by welding for example. The second universal joint, which is on the lower end of the intermediate bar, may comprise a pair of jaws 29 and 31 clamped together by a bolt 33 and conformed to clasp a sphere 27 extending from the geometrical axis of the shaft 15 of an element being balanced, as described in my copending application, previously identified.

All masses under rotation seek to revolve upon an axis passing through the center of gravity of the element, but with an unbalanced member rotating on fixed bearings this condition is not attainable so that the state of unbalance continues, causing vibration, power loss and wear. In accordance with my invention the element being prepared for balanced rotation is so mounted that it is free to shift and select its own axis of rotation, which it does, and the element then rotates on an axis passing through the center of gravity. This self selected axis of rotation, which I have termed the centroidal axis, is represented in Fig. 1 by a dotted line designated "o". The original or geometric axis of the shaft is represented by a dot dash line designated "x". Also in Fig. 3, the same reference characters "o" and "x" have been applied for representing the location of these two axes, and in both Figs. 1 and 3 the displacement of these two axes has been substantially exaggerated for clearness of illustration.

In operation, the intermediate bar 53 takes a slanting position, as shown in Fig. 1, such that the geometrical axis of the element is deflected from and spaced from the axis of rotation 0 sufficiently so that balanced rotation of the element is obtained. This may be a parallel or an angular deflection depending upon the distribution of the mass in the rotating element. This deflection will be in accordance with the amount of unbalanced mass in the element. In this system of rotating bodies the mass of the intermediate bar 53 becomes a part of the unbalanced mass because it is inclined with reference to the vertical and describes a cone. To counter-balance for the effect of the intermediate bar I provide a counterbalancing bar 63 extending from the opposite side of the ring 61 to which it may be secured in any suitable manner, as by welding. I have shown an identical structure for this purpose, although any suitable counterbalancing member may be utilized whereby the distribution of the masses on opposite side of the ring 61 is so arranged that the rotating structure comprising the two universal joints and the intermediate bar 53 is dynamically balanced.

By this arrangement the unbalancing effect of the mass of the intermediate bar 53 is counterbalanced, but a centrifugal effect is set up by the two bars 53 and 63 such that their oppositely disposed masses tend to fly out from the axis of rotation similarly to a fly ball governor which movement is opposed by the weight of the work element 15 hanging from the lower clamp. For proper balancing, it is important to operate the apparatus at a proper speed in accordance with the weight of the work element being balanced, and for this reason each element is weighed before being mounted in the universal clamp. The speed of rotation per minute at which balancing can be done perfectly is then found from the equation:

$$\text{RPM} = K\sqrt{\frac{M_2}{M_1}}$$

and $M_1$ is the mass of the two oppositely disposed members, $M_2$ is the mass of the work element being balanced, and $K$ is a constant depending upon the geometrical shape of the rotating structure.

The element 15 having been weighed and mounted in the bottom universal clamp of the apparatus, is then spun at the proper speed. The work element then selects its own axis of rotation 0 about which balanced rotation is obtained and which axis is displaced from the geometric axis X, as shown, although this has been greatly exaggerated for clearness. In actual practise this displacement would be a very small fraction of the diameter of the shaft 15. While the shaft 15 of the work element is rotating in this manner it has an eccentric throw and describes a surface of revolution. As shown in Fig. 1, the work element 15 is at the extreme right position and the vertical dotted line on the left hand side of the element represents the extreme position of movement of the element to the left, as it rotates to generate a surface of revolution, the axis of rotation being displaced from the geometrical axis a distance as shown. As the element rotates, it is engaged by metal removing means, such as a grinding wheel 41, on the portions where bearing surfaces are to be formed. The grinding wheel is supported upon and driven by the extended shaft of an electric motor 43 which rests slidably upon a supporting and guiding member 45, as described with reference to the first embodiment in the copending parent application. In this manner metal is removed to form bearing surfaces concentric with the self selected axis of rotation 0, and the work element is completed to be journalled for balanced rotation.

If there are several portions of the shaft 15 of the work element to be journalled, the bearing surfaces should be formed simultaneously at all these points, to avoid throwing the first formed bearing surface out of balance when metal is removed to form the second bearing surface on the shaft.

In Fig. 2 I have shown the structural details of the work supporting clamp jaws 29 and 31, for use when positive driving of the work piece is desired instead of clamping the jaws tightly upon the sphere 27 and driving by friction. In this arrangement slots 35 are cut into diametrically opposite sides of the sphere 27, substantially vertical and parallel to the axis of the shaft 15 of the work piece, as disclosed in greater detail in my co-pending patent application.

Each of the jaws 29 and 31, of the universal support, is provided with an inwardly projecting pin 37 which may be supported rigidly therein as by having the outer end threaded and turned into a suitable threaded aperture in the jaw. The pins 37 are substantially aligned on a diameter of the sphere and the clamping jaws. As the sphere 22 of the element to be balanced is secured into the jaws, the pins 37 are inserted into the oppositely disposed slots 35. Friction reducing roller sleeves 39 are preferably provided on the pins.

As the power is applied to the drive shaft 51, the pins projecting into the slots 35 apply power to positively drive and rotate the shaft 15 of the work piece which is quickly brought up to speed without slippage.

In this positive driving arrangement the jaws may be closed very loosely about the sphere for permitting free swinging or tilting movement so that the element will very accurately select its axis of balanced rotation after being brought up to speed. In operation, the force of a cutting tool on the element can not cause it to slip in the jaws. And when the operation is completed, the work piece can be more quickly stopped and removed so that a new element may be inserted and production expedited.

The apparatus shown may also be utilized for preparing the element 15 for balanced rotation on pivot pins or shafts aligned axially with the 0 axis of the work piece or element, as shown in Fig. 3. For this purpose, the end of the shaft 15, while rotating, is approached by any suitable drill 47 aligned on the 0 axis, and an aperture is formed in the end of the shaft having bearing surfaces concentric with this self selected axis of rotation.

It is apparent that within the scope of the invention, modifications and different arrangements may be made other than herein disclosed, and the present disclosure is illustrative merely, the invention comprehending variations thereof.

I claim:

1. In balancing apparatus the combination of, a drive shaft journalled for rotation on a substantially vertical axis, a universal joint on the lower end of the drive shaft, an intermediate member extending from said universal joint, means on the other end of said intermediate member for universally supporting and rotating a piece of work to be prepared for balanced rotation, and a member of similar mass extending from the universal joint in an opposite direction from the intermediate member for counter-balancing.

2. In combination in a counter-balanced double universal apparatus for preparing a rotating work piece for balanced rotation, a shaft, support means for journalling said shaft for rotation on a substantially vertical axis, a universal movement power transmission joint on the lower end of said shaft, an intermediate member suspended therefrom and secured at one end to said universal joint for support and rotation, holding means on the lower end of said intermediate member for holding and rotating a work piece suspended for free movement therefrom, counter-balancing means rigid with said intermediate member and projecting in the opposite direction from said universal joint, and said counter-balancing means being of a suitable mass having the center of gravity suitably spaced from the axis of rotation through the first mentioned universal joint for counter-balancing the mass of said intermediate member and the holding means on the lower end thereof.

3. In combination in a counter-balanced double universal apparatus for preparing a rotating work piece for balanced rotation, a shaft, support means for journalling said shaft for rotation on a substantially vertical axis, a U shaped yoke secured on the lower end of said shaft with the legs projecting downwardly, a shaft extending and journalled between the lower ends of legs of yoke, cross arms projecting in opposite directions from the center of said shaft, a ring pivoted upon said cross arms so that said arms extend diametrically through the ring, an intermediate bar secured to and projecting radial from one side of said ring, a pair of universal clamping jaws on the other end of said intermediate bar for clasping a ball projecting from a work piece to suspend it freely movable therefrom, means for clamping said jaws together, a counter-balancing member secured rigidly to said ring and projecting radially therefrom in a position diametrically opposed to said intermediate bar, and said counter-balancing member being of a suitable mass having the center of gravity suitably spaced for counter-balancing the mass of said intermediate member with its clamping jaws.

4. In combination in a counter-balanced double universal apparatus for preparing a rotating work piece for balanced rotation, a shaft, means for rotating said shaft, support means for journalling said shaft for rotation on a substantially vertical axis, a universal joint on the lower end of said shaft, an intermediate member suspended therefrom and secured at one end to said universal joint for support and rotation, universal holding means on the lower end of said intermediate member for holding and rotating a work piece suspended for free movement therefrom, counter-balancing means rigid with said intermediate member and projecting in the opposite direction from said universal joint, said counter-balancing means being of a suitable mass having the center of gravity suitably spaced from the axis of rotation through the first mentioned universal joint for counter-balancing the mass of said intermediate member and the holding means on the lower end thereof, metal removing means, support means movably supporting said metal removing means for engaging a work piece held and rotated by said holding means.

5. In combination in a counter-balanced double universal apparatus for preparing a rotating work piece for balanced rotation, a shaft, support means for journalling said shaft for rotation on a substantially vertical axis, means for rotating said shaft, a U shaped yoke secured on the lower end of said shaft with the legs projecting downwardly, a shaft extending and journalled between the lower ends of said yoke, cross arms projecting in opposite directions from the center of said shaft, a ring pivoted upon said cross arms so that said arms extend diametrically through the ring, an intermediate bar secured to and projecting radially from one side of said ring, a pair of universal clamping jaws on the other end of said intermediate bar for clasping a ball projecting from a work piece to suspend it freely movable therefrom, means for clamping said jaws together, a counter-balancing member secured rigidly to said ring and projecting radially therefrom in a position diametrically opposed to said intermediate bar, and said counter-balancing member being of a suitable mass having the center of gravity suitably spaced for counter-balancing the mass of said intermediate member with its clamping jaws, metal removing means, and means supporting said metal removing means movably for engaging a rotating work piece suspended from and rotated by said clamping jaws.

CLARE F. SALTZ.